United States Patent [19]

Goodman et al.

[11] 4,125,519

[45] Nov. 14, 1978

[54] POLYPEPTIDES CONTAINING 3,4-DIHYDROXYPHENYLALANINE

[76] Inventors: Murray Goodman, 9760 Blackgold Rd., La Jolla, Calif. 92037; Michael S. Verlander, 407 7th St., Del Mar, Calif. 92014; William D. Fuller, 4126 Seri, San Diego, Calif. 92117

[21] Appl. No.: 731,946

[22] Filed: Oct. 13, 1976

[51] Int. Cl.$^2$ ............................................. C08G 69/10
[52] U.S. Cl. ..................................... 528/363; 210/54; 260/45.9 NC; 424/117; 426/133; 528/271; 528/369; 528/210
[58] Field of Search ......... 260/47 CP, 78 A, 77.5 CA

[56] References Cited

U.S. PATENT DOCUMENTS

| | | | |
|---|---|---|---|
| 2,847,461 | 8/1958 | Lecher et al. | 260/519 |
| 3,433,766 | 3/1969 | Holmen | 260/47 |
| 3,943,106 | 3/1976 | Schmidt et al. | 260/47 C |
| 3,996,197 | 12/1976 | Binsack | 260/47 CP |

*Primary Examiner*—Lester L. Lee
*Attorney, Agent, or Firm*—Larson, Taylor and Hinds

[57] ABSTRACT

Homopolymers and copolymers containing the amino acid 3,4-dihydroxy-L-phenylalanine (dopa) have been prepared via the synthesis of a protected N-carboxyanhydride (NCA) of the amino acid. These dopa-containing polymers have many uses as in the treatment of Parkinsonism, as drug delivery systems, antioxidants, and fibers and in the production of non-thrombogenic substrates.

8 Claims, No Drawings

POLYPEPTIDES CONTAINING 3,4-DIHYDROXYPHENYLALANINE

FIELD OF THE INVENTION

This invention relates to polymers containing 3,4-dihydroxyphenylalanine (hereinafter referred to as "dopa"), to methods for their preparation and to novel uses for the polymers.

BACKGROUND OF THE INVENTION

Preparation of homopolymers and copolymers of various alpha-amino acids, including phenylalanine, are known as is illustrated, for instance, by the disclosures in U.S. Pat. No. 3,867,520 to Mori et al, U.S. Pat. No. 3,331,814 to Randall et al, U.S. Pat. No. 2,657,972 to Woodward and U.S. Pat. No. 2,729,621 to Miegel. Before the research efforts of the present inventors, however, polymers containing dopa were unknown and could not be produced by the polymerization procedures disclosed in the aforementioned patents. While di- and tripeptides of dopa had been reported in U.S. Pat. No. 3,803,120 to Felix, the higher polymeric forms have not been produced apparently because of the interfering action of the phenolic hydroxyl groups that characterize dopa. Thermal polymerization does not give high molecular weight polymers with a monomer containing such an aromatic hydroxy-containing group.

Dopa and the dopa dimers and trimers have found use medically in the treatment of Parkinsonism. They also have other interesting physiological properties such as that of preventing platelet aggregation. An advantage offered by the dopa-containing polymers of the present invention is that not only do they possess the capability of exhibiting these physiological properties but they do so over extended periods of time because of the polymeric nature of the materials. In the dimer and trimer dopa systems disclosed in the Felix patent, the dopa is believed to become biologically active by cleavage of a di- or tripeptide form. A prolonged effect can be produced from the polymers of the present invention by proteolysis of the polymer to produce either free dopa or oligomers containing dopa, both of which are pharmacologically active. Moreover, the duration of the aforementioned prolonged effect achieved by the dopa-containing polymers of the present invention can be varied by preparing copolymers of the dopa with other amino acids wherein the amount and nature of the amino acid is changed.

OBJECTS

It is an object of the invention, therefore, to provide high molecular weight protected and unprotected dopa-containing homopolymers and copolymers having prolonged biological activity.

Another object of the invention is to provide dopa-containing copolymers with properties such as water-solubility, hydrolytic stability, etc., which can be varied so as to increase the range of application of these materials to include, for example, metal chelating and antioxidant properties, dopa delivery systems, and film or fiber formation.

SUMMARY OF THE INVENTION

These and other objects of the invention are obtained by a normally solid, linear polymer having as a recurring unit the structure:

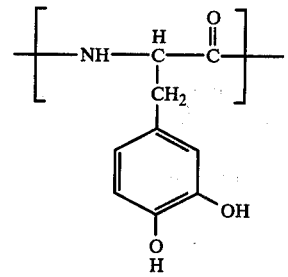

The novel polymers may be homopolymers of dopa or copolymers of dopa and one or more dissimilar amino acids and may be prepared by polymerization of the corresponding N-carboxyanhydride derivative (hereinafter referred to as NCA) of protected L- or D-dopa alone or with one or more alpha amino acids. It is important that the hydroxyl groups of the dopa monomer be protected as will be discussed below prior to the actual polymerization, otherwise the high molecular weight polymers of the invention are not obtained.

Thus, in accordance with the present invention, the dopa-containing polymers are obtained by first protecting the hydroxyl groups of the dopa monomer with a blocking group such as an acetyl group and then converting the protected dopa to the NCA derivative by treatment with phosgene in the conventional manner. The resulting protected NCA derivative has been found to be a highly active monomer which can be homopolymerized or copolymerized with dissimilar amino acids to provide extraordinarily high molecular weight homo- or copolypeptides that are normally solid linear polymers having recurring protected units of the following structure:

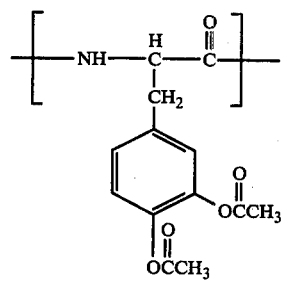

Deprotection of the protected homopolymers and copolymers thus obtained results in the novel high molecular weight dopa-containing polymers of the invention.

The molecular weights of both the protected and unprotected homopolymers and copolymers of the invention may vary widely but in each case the molecular weight in general will be at least 100,000.

Protection of the hydroxyl groups of dopa prior to conversion to the NCA derivative is readily achieved, for instance, by simply acetylating the dopa so as to provide O,O'-diacetyl dopa. The NCA derivative of this protected dopa, i.e. O,O'-diacetyl-dopa NCA, unlike other protected NCA derivatives of dopa, has been surprisingly found to polymerize both alone and with dissimilar amino acids to the high molecular weight polymers of the invention. In addition, the O,O'-diacetyl-dopa NCA requires no purification before use and polymerizes quantitatively (i.e. to 100% yield) to the high molecular weight materials.

Deprotection of the protected homopolymers or copolymers of the invention can be achieved by conventional blocking or protecting group removal techniques. For instance, where the protecting group is an acyl group any of the well known deacylation techniques can be used. Deacetylation, for example, can be accomplished by treatment with ethanolamine.

An example of the synthesis for the preparation of poly(L-dopa) can be represented as follows:

The preferred copolypeptide synthesis of the invention can be illustrated as follows:

N-carboxyanhydrides of both dopa and a dissimilar alpha amino acid are first prepared using, for instance, the general procedure outlined above and copolypeptides are obtained from solutions of the monomers according to the following synthesis:

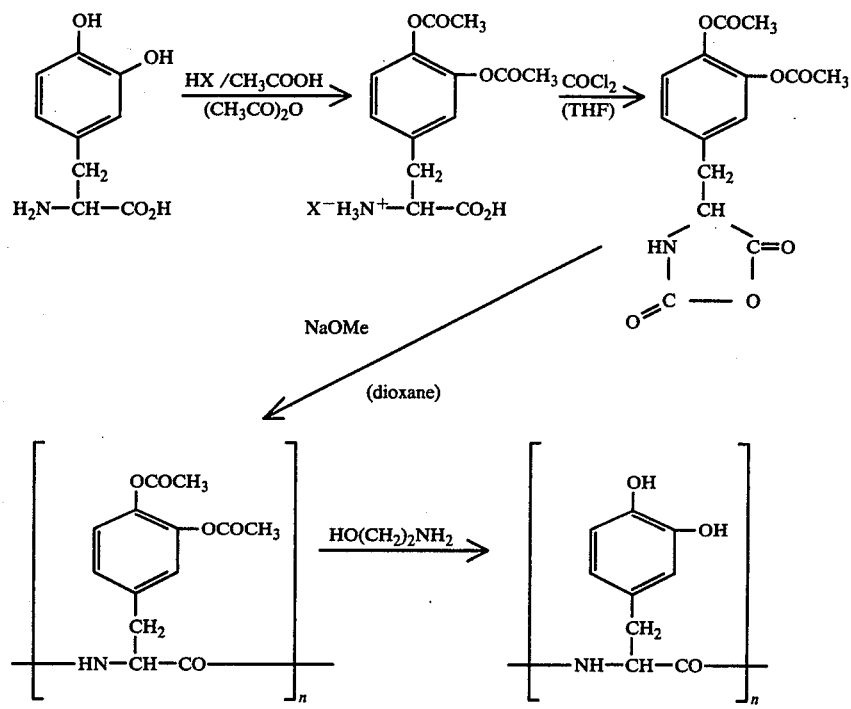

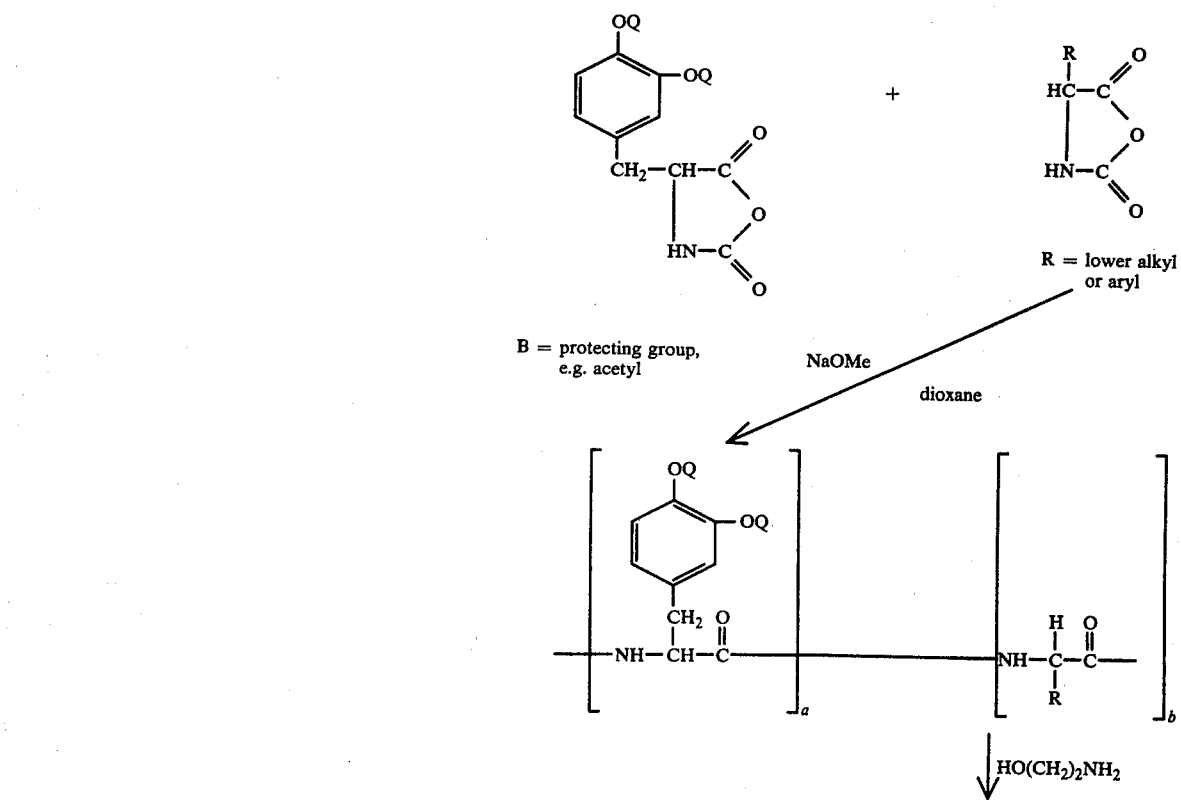

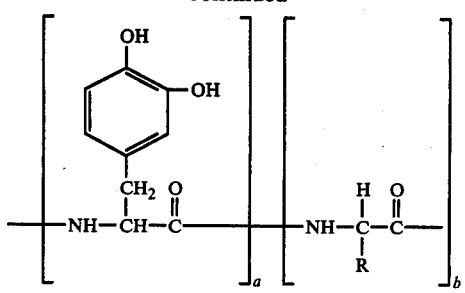

In the preparation of the copolypeptides of the invention, the only essential requirement imposed on the selection of the amino acid monomers is that they be polymerizable with the protected N-carboxyanhydride derivative of dopa. In addition, should the amino acid contain a substituent which may cause side reactions during the copolymerization, protection of the substituent with a standard blocking agent (e.g. a carbobenzoxy, t-butyloxycarbonyl, acetyl and like groups) by well known blocking procedures is recommended. The copolypeptides of the invention may be water-insoluble or water-soluble depending upon the type of amino acid selected, the molar ratio of the amino acids employed, and the molecular weight of the copolymer. By way of illustration, water-solubility in the copolypeptides may be conferred by selecting amino acids and mixtures thereof containing groups such as hydroxyalkylglutamine groups, carboxyl groups, alkylene oxide groups, and the like or having groups which can be subsequently converted into such groups.

Exemplary of amino acids, one or more of which can be allowed to react with the protected NCA derivative of dopa are glutamic acid, benzylglutamic acid, alanine, glutamine, leucine, phenylalanine, lysine, tyrosine, valine, asparagine, glycine, etc.

Illustrative of the preferred copolypeptides in accordance with the present invention are copolypeptides comprising copolymers having the following structure:

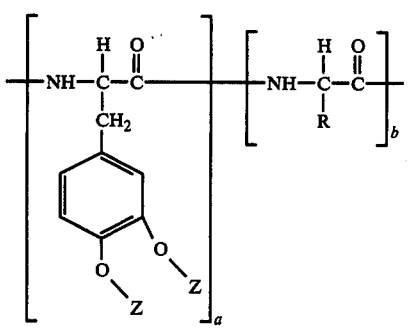

wherein R is substituted or unsubstituted lower alkyl or aryl such as phenyl, Z is H or a suitable protecting group, a and b are integers, the ratio a:b being in the range of 1:1 to 1:25 preferably 1:4 to 1:10.

The polymerization or condensation reaction of the protected dopa NCA alone or with one or more of the amino acids can be conducted simply by adding the reactant or reactants to a suitable inert liquid diluent with or without a catalyst, preferably under anhydrous conditions and continuing the reaction until a protected polypeptide having a molecular weight in excess of 100,000 is obtained. The inert liquid diluent is preferably an organic solvent for the starting material or materials but may be a non-solvent for the polymeric products. Suitable inert liquid diluents which can be used include, for example, aromatic hydrocarbons such as benzene, toluene and the like; chlorinated hydrocarbons such as chlorobenzene; ethers, such as dioxane; and organic solvents, such as dimethyl formamide, dimethyl sulfoxide and the like. Other suitable diluents will be obvious to those skilled in the art.

The homopolymers are preferably prepared by polymerizing the protected NCA of dopa in solution. The copolymerization of the invention, on the other hand, may be effected to produce either random (i.e. irregular) copolymers of dopa and other amino acids or sequence copolymers (containing regular, alternating sequences of amino acids). The random copolymers are easily synthesized in solutions of the NCA's of the respective monomers. Sequence copolymers can be prepared using the NCA's of the amino acid to prepare dimeric, trimeric or tetrameric units in solution and then polymerizing these by conventional active ester techniques. Alternatively, regular sequence copolymers of dopa can be prepared by well-defined peptide polymerization methods.

Although the polymerization may be conducted in the absence of a catalyst or initiator, use of a catalyst is preferred and in most instances necessary. Suitable catalysts include dibenzyl glutamate, n-butylamine; tertiary amines such as triethylamine, tributylamine, triamylamine, pyridine, N,N-dimethyl aniline, etc; alkali metal alkoxides such as sodium methoxide or sodium ethoxides; and strong bases such as sodium hydroxide or potassium hydroxide and the like. The concentration of the catalyst may vary widely. Generally, the concentration of the catalyst falls in the range of about 0.01% to 20% by weight.

The following examples are included to further illustrate the present invention.

Synthesis of
Di-O-Acetyl-L-Dopa-N-Carboxyanhydride

The N-carboxyanhydride (NCA) is prepared by heating di-O-acetyl-L-dopa hydrochloride in dry dioxane (in a flask equipped with a drying tube and open to the atmosphere) with a 3-fold molar excess of phosgene (as a 3.4 molar solution in dry benezene) for 2.5 hrs. at 65°. The NCA is crystallized directly from the reaction mixture in 89% yield by adding to seeded petroleum ether and storing at −15° overnight; m.p. 139°–141°.

Preparation of Dopa-Containing Polypeptides

EXAMPLE 1

Poly(Di-O-Acetyl-L-Dopa)

Polymerization is effected by initiating a 10% solution of the NCA in dry dioxane with sodium methoxide (A/I = 200). After stirring for 4 days at room temperature the thick gel is diluted with an equal volume of petroleum ether and triturated to a fine powder, to yield poly(di-O-acetyl-L-dopa) (88%): intrinsic viscosity (DCA) = 0.77.

EXAMPLE 2

Copoly(γ-Benzyl-L-Glutamate:Di-O-Acetyl-L-Dopa)

Polymerization is as described in Example 1, using an equimolar mixture of γ-benzyl-L-glutamic acid NCA (prepared as described for diacetyldopa NCA) and di- O-acetyl-L-dopa NCA. The 1:1 random copolymer is obtained in 93% yield.

Removal of Protecting Groups from Polymers

EXAMPLE 3

Deacetylation of Poly(Di-O-Acetyl-L-Dopa)

Poly-L-dopa is obtained by deacetylation of the poly(di-O-acetyl-L-dopa) of Example 1 in dry 3-amino-1-propanol at room temperature overnight. The polymer is recovered in 90% yield by precipitation with petroleum ether.

EXAMPLE 4

Debenzylation of Copoly (γ-Benzyl-L-Glutamate: Di-O-Acetyl-L-Dopa)

Copoly (L-glutamic acid: di-O-acetyl-L-dopa) is prepared by standard procedures (passage of dry hydrogen bromide through a solution of the copolymer of Example 2 in benzene at room temperature for 5 hours) in 95% yield, after precipitation with petroleum ether.

EXAMPLE 5

Aminolysis of Copoly (γ-Benzyl-L-Glutamate: Di-O-Acetyl-L-Dopa)

Copoly (L-hydroxypropylglutamine: L-Dopa) is prepared by dissolving the copolymer of Example 2 in dry 3-amino-1-propanol and stirring at room temperature for 2 days. Precipitation with petroleum ether gives the product in 85% yield.

As mentioned above the polypeptides of the present invention find utility in a number of areas as, for example, anti-Parkinson agents, antioxidants, metal chelating agents and delivery systems, each of which will be discussed below under separate headings.

Anti-Parkinson Agents

The polypeptides of the present invention as well as their salts, may be used in the form of conventional pharmaceutical preparations which contain the polymers in connection with convention pharmaceutical organic or inorganic materials suitable for internal administration. The pharmaceutical compositions containing the polypeptides as well as their salts can be administered parenterally or orally. Dosages can be administered to individual requirements. For example, the polypeptides of Example 4 can be administered in dosages of from about 10mg./kg. to about 70 mg./kg. p.o. per day. These dosages can be administered in a single dosage form or in divided dosage forms. The pharmaceutical compositions can contain conventional organic or inorganic inert materials such as water, gelatin, lactose, starch, magnesium stearate, talc, vegetable oils, gums, polyalkylene glycols, Vaseline and the like. The pharmaceutical preparations can be in conventional solid dosage forms such as tablets, suppositories, capsules or in conventional liquid dosage forms such as solutions, suspensions or emulsions. The pharmaceutical compositions can be submitted to conventional pharmaceutical expedients such as sterilization and/or can contain conventional pharmaceutical additives such as preservatives, stabilizing agents, wetting agents, emulsifying agents, salts for adjusting the osmotic pressure, buffers or the like. They can also contain other therapeutically useful materials. Compositions can be formulated which contain from 1% to 99% by weight of the active ingredient of the polypeptide of the present invention and from 1% to 99% by weight of inert carrier materials.

The following example illustrates the manufacture of tablets exhibiting anti-Parkinson activity.

EXAMPLE 6

Polypeptide of Examples 3 or 5 — 100 mg.
Lactose — 61 mg.
Corn starch — 30 mg.
Polyvinylpyrrolidone — 4 mg.
Talcum — 5 mg.

The polypeptide is mixed with the lactose and corn starch and after the initial solution of polyvinylpyrrlidone in 40 ml. of ethanol, is granulated. The granulate is dried at 30° C, mixed with talcum and pressed into tablets.

Dopa Polymers as Chelating Agents

The polypeptides of the invention are capable of readily forming chelates with metals. When the polymer is reacted with an aqueous solution containing heavy metal ions, complexes of the metals are formed which are insoluble in water and precipitate out of solution. The processes for removing heavy metal ions from aqueous solutions using the novel polypeptides of the invention can be illustrated as follows:

If a water soluble polymer is used, a solution containing an amount of polymer in excess of the equilibrium value needed to complex the heavy metal ions is added to the aqueous solution containing the heavy metal ions so as to precipitate the coordinated heavy metal ions. If copper ions are treated in this manner, for example, a characteristic blue color is imparted to the precipitates.

When the polypeptide of the invention is a water-insoluble polymer, the polymer may be used as a powder or in some other form. The polymer can also be prepared as a ball pellet resin similar to an ion-exchange resin by reacting the compounds in a suspension of an aqueous solution containing the starting materials in an inert organic solvent, which is not miscible with water and does not dissolve the starting material in comparison to water. In accordance with this method, the polymer is packed in a column and an aqueous solution containing the heavy metal ions is poured into the column, whereby the heavy metal ions corresponding to the molar ratio of the phenolic groups of the polypeptide are absorbed. The heavy metal ions thus absorbed can be easily eluted from the polymer by passing an aqueous acidic solution containing a mineral acid such as hydrochloric acid through the column. Illustrative of metals which can be chelated utilizing the polypeptides of the present invention are iron, nickel, cobalt, lead, cadmium, mercury, rhodium, gold, palladium, and the like, as well as copper. The following example illustrates the chelating properties of the polypeptides of the present invention.

EXAMPLE 6

A 1% aqueous solution containing 10 grams of the copolymer of Example 5 is added to 10 grams of a 1% cupric sulphate solution. A deep blue colored polymer precipitates.

Dopa Delivery Systems

Polypeptides of the invention may be used successfully as carriers or delivery systems for a therapeutic or pharmaceutically active agents. For instance, effective amounts of the active agents may be incorporated directly into a shaped article of the polypeptide of the invention, such as a film or fiber of the polymer. Alternatively, the pharmaceutically active agent can be dissolved or dispersed in a suitable carrier and the resulting mixture of active agent and carrier then can be dispersed in a continuous matrix of the polymer of the invention as is described, for example, in U.S. Pat. No. 3,867,530 to Mori et al, hereby incorporated by reference.

Illustrative of therapeutic or pharmaceutically active agents which can be employed include: germicides, such as antibiotics, anti-fungal agents, corticosteroids or other hormones, and generally any biological or chemotherapeutic pharmaceutical agents suitable for topical application, that is, capable of having a medicinal effect on the body when in contact with the skin or exposed tissues to which the shaped article is applied. The effective amounts of the pharmaceutical agent in the polypeptide will vary but in general falls within the range of about 2% to 60% by weight.

Preparation of shaped articles of the polypeptides of the invention incorporating pharmaceutically active agents may be accomplished by any of the conventional film forming and fiber forming methods and molding techniques.

EXAMPLE 7

10 grams of the polymer of Example 5 is dissolved in 50 ml. of dioxane. To the mixture is added 5 grams of neomycin sulphate, in 20 ml. of water. The resulting viscous solution is then deaerated and spread onto release paper in a uniform layer and air dried. The dried film is then stripped from the release paper.

Use as Antioxidants

The dopa-containing polymers of the invention, because of the catechol structure of the side chain, are useful as antioxidants for products or materials susceptible to oxidative deterioration. Thus, the polymers may be used in effective antioxidant quantities for the preservation of food and food products, in the prevention of deterioration of petroleum products, such as lubricating oils and gasoline, rubber, and plastics such as hydrocarbon polymers, e.g. polyethylene and propylene.

Dopa-containing polymers of the invention are characterized by a relatively large molecular structure. This molecular size and/or the amino acid components resistant to enzymatic action that the dopa-containing polymers may contain, endow the polymers with the property of being non-absorbable in the human body. This non-absorbability feature of the dopa-containing polymers makes them particularly desirable as antioxidants for foods since they will be passed through the gastrointestinal tract.

In the area of food preservation, it is the function of the antioxidant to retard oxidative deterioration, rancidity in fats, oils or off-flavor in frozen foods, flavoring oils, beverages, etc. Thus, the dopa-containing polymers of the invention will find use as antioxidants in wine, beer, sugar syrups; cut, peeled or dried fruits and vegetables; cooked, cured, comminuted meat products; frozen fish, flavoring oils, emulsions, confectionary, lard, vegetable oils, hydrogenated shortenings, crackers, biscuits, breakfast cereals, dry cake mixes and soup mixes. The exact antioxidant quantities of the dopa-containing polymers employed will depend on the particular products or materials to be protected. In general, however, the amount will range from about 0.01 to 5% by weight.

EXAMPLE 8

The oxidative deterioration of a commercial liquid hydrogenated shortening is retarded by dispersing therein 0.1% by weight of the copolymer of Example 5.

Similar results may be obtained by adding like amounts of the copolymer to sugar syrups, flavoring oils, beer, lubricating oils, polyethylene and breakfast cereals.

It is claimed:

1. A normally solid linear polymer having as a recurring unit the structure:

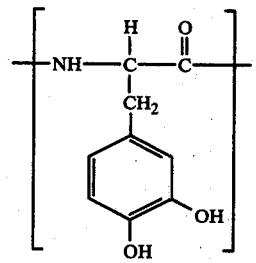

said polymer having a molecular weight of at least 100,000.

2. Normally solid poly(3,4-dihydroxy-L-phenylalanine) having a molecular weight of at least 100,000.

3. A normally solid linear copolymer comprising the copolymer of the N-carboxyanhydride derivative of 3,4-dihydroxy-L-phenylalanine having the structure:

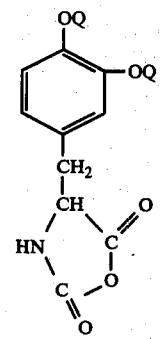

wherein Q is a protecting group, and a copolymerizable dissimilar alpha-amino acid, said copolymer having a molecular weight of at least 100,000.

4. A normally solid, linear copolymer having the structure:

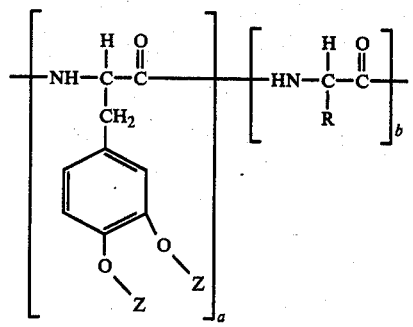

wherein R is a substituted or unsubstituted lower alkyl or aryl, Z is H or a suitable protecting group, *a* and *b* are integers, the ratio of *a* to *b* being in the range of 1:1 to 1:25, said copolymer having a molecular weight of at least 100,000.

5. The copolypeptide of claim 4 wherein Z is H.

6. The copolypeptide of claim 4 wherein R is

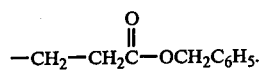

7. The copolypeptide of claim 4 wherein R is

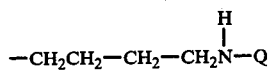

wherein Q is a protecting group.

8. The copolypeptide of claim 4 wherein the ratio of *a* to *b* is in the range of about 1:4 to 1:10.